United States Patent
Botros

(10) Patent No.: US 7,091,276 B2
(45) Date of Patent: Aug. 15, 2006

(54) COATING MATERIAL FOR NON-POROUS AND SEMI-POROUS SUBSTRATES

(75) Inventor: Raouf Botros, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 216 days.

(21) Appl. No.: 10/640,288

(22) Filed: Aug. 13, 2003

(65) Prior Publication Data

US 2005/0038148 A1 Feb. 17, 2005

(51) Int. Cl.
| | |
|---|---|
| B05D 5/04 | (2006.01) |
| C08L 33/02 | (2006.01) |
| C08L 33/04 | (2006.01) |
| C08L 25/08 | (2006.01) |
| C08L 39/00 | (2006.01) |

(52) U.S. Cl. .................... 524/522; 524/523; 524/555; 524/556

(58) Field of Classification Search ................ 524/522, 524/523, 555, 556; 523/160, 161
See application file for complete search history.

(56) References Cited

U.S. PATENT DOCUMENTS

| 4,255,754 A | | 3/1981 | Crean et al. |
| 4,698,123 A | | 10/1987 | Link et al. |
| 4,751,517 A | | 6/1988 | Crean et al. |
| 5,085,698 A | * | 2/1992 | Ma et al. ..................... 524/388 |
| 5,446,083 A | * | 8/1995 | Stevens et al. ............. 524/458 |
| 5,958,999 A | * | 9/1999 | Bates et al. ................. 523/161 |
| 5,959,035 A | * | 9/1999 | Guo ........................... 525/123 |
| 6,008,273 A | * | 12/1999 | Leibelt et al. .............. 523/409 |
| 6,386,695 B1 | * | 5/2002 | Kowalski .................... 347/100 |
| 6,733,120 B1 | * | 5/2004 | Ogasawara et al. ......... 347/100 |
| 2002/0058194 A1 | | 5/2002 | Williams et al. |
| 2002/0112641 A1 | * | 8/2002 | Naruse et al. ........... 106/31.27 |
| 2004/0092621 A1 | | 5/2004 | Kataoka et al. |
| 2004/0191432 A1 | * | 9/2004 | Loccufier et al. ........ 428/32.24 |

* cited by examiner

*Primary Examiner*—Callie Shosho
(74) *Attorney, Agent, or Firm*—Sarah Meeks Roberts

(57) ABSTRACT

A substrate coating is provided for application in association with ink jet ink imaging on the substrate. The coating enhances permanence of black and specialty non-black color ink jet prints. The coating material of the present invention can be applied to any non-porous or semi-porous substrate as a pre-print coating. The coating comprises a combination of two polymers, and DMEA to discourage adverse interaction between the two polymers.

20 Claims, No Drawings

COATING MATERIAL FOR NON-POROUS AND SEMI-POROUS SUBSTRATES

TECHNICAL FIELD

The present invention relates to ink jet printing and, more particularly, to the application of black and color inks to a specialty coated substrate for achieving enhancement in permanence and image quality.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

Achieving improvement in permanence and darkness of ink jet print remains a top priority in the printing business. For ink jet business to grow in the non-porous and semi-porous substrate arts, such as printing on metals and plastics, significant improvement in water resistance, print quality, and print adhesion of the image must be demonstrated.

Dye-based aqueous inks have not been suitable for printing on metals or plastics, due to their inherent high surface tension and their inability to wet non-porous substrates. Even when the surface tension is lowered enough to improve wetting, the ink does not stick to the surface, due to lack of surface penetration. Non-porous and semi-porous substrates have been resistant to dye-based aqueous inks because the print image is not suitably waterfast, and is not resistant to smudging or bleeding. Only solvent inks can produce rubfast images on these surfaces, but with the inherent disadvantage of high volatile organic compounds, safety and health concerns.

It is seen then that there is a need for an improved method of optimizing waterfastness and minimizing smudging and bleeding of environmentally safe aqueous, black or non-black, dye-based inks, when printed on non-porous or semi-porous substrates.

SUMMARY OF THE INVENTION

This need is met by the coating material according to the present invention, wherein enhancement in permanence of black and specialty non-black color ink jet prints, resistant to smudging and bleeding, is achieved. With the coating material of the present invention, non-porous materials, such as plastic and metal, can be printed with aqueous ink when the surface is precoated with the coating material. The coating material combines an acrylic polymer with polyethyleneimine (PI) or ethoxylated polyethyleneimine (EPI), and uses DMEA to discourage interaction between the two polymers. A mixture of alcohol and MEK can be used for drying.

In accordance with one aspect of the present invention, a coating material for application on a non-porous or semi-porous substrate for use with an ink jet printing system comprises an acrylic polymer combined with a polyethyleneimine polymer, and DMEA to prevent adverse interaction between the two polymers. When the coating material is applied to the non-porous or semi-porous substrate, waterfast prints are produced which are resistant to smudging or bleeding when subjected to moisture.

Other objects and advantages of the invention will be apparent from the following description and the appended claims.

DETAILED DESCRIPTION OF THE INVENTION

The present invention proposes a coating material for application on a non-porous or semi-porous substrate. The application occurs before printing, as a pre-coat, using any suitable application means such as spraying. The coating material is particularly advantageous for use on a non-porous or semi-porous substrate, such as metal or plastic. The substrate coating enhances the permanence of ink jet imaging on the substrate to produce waterfast prints resistant to smudging or bleeding even when subjected to moisture.

In accordance with the present invention, the coating composition comprises an acrylic polymer combined with a polyethyleimine or ethoxylated polyethyleimine polymer. Acrylic polymers are known to be effective film formers on a variety of non-porous substrates. However, due to the anionic nature of acrylic polymers, such polymers are a poor dye fixative, since the dyes in ink jet inks are also anionic. A better fixative for ink jet ink dyes are a polyethyleimine or ethoxylated polyethyleimine polymer. PI and EPI are strong cationic polymers. Therefore, PI and EPI are capable of fixing the ink jet ink dye, rendering it insoluble and waterfast.

It would appear, therefore, that an acrylic polymer could be combined with PI or EPI in a pre-coating fluid, to result in a fixed dye with good adhesion to a non-porous substrate. Unfortunately, such a mixture produces and immediate white precipitate due to the opposite charge of the polymers.

In accordance with the present invention, an acrylic polymer can be combined with PI or EPI to produce a stable coating fluid. In particular, a specified amount of DMEA is used in the coating fluid to prevent the adverse interaction between the two polymers in the coating fluid.

The following example illustrates a stable formulation for the coating fluid of the present invention.

EXAMPLE 1

| | |
|---|---|
| Aqueous acrylic polymer 30% solution | 45.0% |
| DMEA | 5.0% |
| Ethoxylated Polyethyleneimine 37% solution | 5.0% |
| Denatured Alcohol | 15.0% |
| MEK | 30.0% |

EXAMPLE 2

| | |
|---|---|
| Aqueous acrylic polymer 30% solution | 45.0% |
| DMEA | 4.0% |
| Polyethyleneimine, 50% solution | 4.0% |
| Denatured Alcohol | 17.0% |
| MEK | 30.0% |

There is no difference in permanence and image quality of ink applied to a non-porous or semi-porous substrate coated with the composition of Example 1 as compared to a pre-coat of Example 2. That is, when the unethoxylated polyethyleneimine is used rather than ethoxylated polyethyleneimine, the performance of the ink applied to the pre-coated surface is comparable.

In Example 1, the aqueous acrylic polymer can be any commercially available acrylic polymer, such as a 30% aqueous acrylic polymer IJX 8154-99, available from Westvaco. In a preferred embodiment of the invention, the acrylic polymer comprises styrene acrylic copolymer. The EPI in Example 1 can be any suitable commercially available EPI, such as Lupasol SC-61B, available from BASF as a 37% solution. In Example, 2, the PI is commercially available from Aldrich as a 50% solution. In both Examples 1 and 2, the coating fluid made in accordance with the listed components was stable.

EXAMPLE 3

| | |
|---|---|
| Denatured Alcohol | 50.0% |
| Ethoxylated Polyethyleneimine 37% solution | 5.0% |
| MEK | 45.0% |

Coating made according to Example 3 was stable. However, when applied to aluminum and plastic substrates, then imaged with 1036 ink, the prints had no permanency and washed off with water. This implies that the acrylic polymer component is needed for film formation and adhesion. In a preferred embodiment, the acrylic polymer comprises styrene acrylic copolymer.

EXAMPLE 4

| | |
|---|---|
| Aqueous acrylic polymer 30% solution | 45.0% |
| DMEA | 5.0% |
| Ethoxylated Polyethyleneimine 37% solution | 5.0% |
| MEK | 45.0% |

When denatured alcohol was removed from the composition, as is shown by Example 4, the resulting mixture was cloudy, and separated into two layers. This implies that the alcohol adds the necessary means to keep the components in the solution.

EXAMPLE 5

| | |
|---|---|
| Aqueous acrylic polymer 30% solution | 50.0% |
| Ethoxylated Polyethyleneimine, 50% solution | 5.0% |
| Denatured Alcohol | 45.0% |

The coating solution formulated in accordance with Example 5 was initially cloudy, then a white precipitate formed at the bottom of the container. Apparently, without the inclusion of DMEA, the anionic and cationic polymers interact, to the detriment of the purpose of the coating solution. Furthermore, it appears that the amount of DMEA must exceed 2% of the solution, as the inclusion of just 2% DMEA still resulted in a cloudy, separating mixture, thereby not preventing the adverse interaction of the polymers.

To determine the effectiveness of the solutions in each example above, different types of non-porous or semi-porous substrates, such as aluminum foil and plastic credit cards, were precoated with solutions of each Example, followed by markings and drawdowns with 1036 black aqueous ink. The images produced were evaluated for permanency to wet and dry rub.

Actual application of the coating fluid can be by any suitable means, such as a sprayer, followed by actual printing on a suitable printer. The sprayed and imaged substrate prints were evaluated for waterfastness, bleed, and print intensity. The following chart compares waterfastness and print quality with and without the pre-coat of Example 1, where the substrates were imaged with 1036 black inks by drawdowns.

Plastic Credit Cards

| | precoat and ink | only ink |
|---|---|---|
| waterfastness | 92% | 8% |
| print quality | good coverage | mottled |

UV Coated Glossy Substrate

| | precoat and ink | only ink |
|---|---|---|
| waterfastness | 96% | 31% |
| print quality | average coverage | extreme mottling |

CD Plastic Pockets

| | precoat and ink | only ink |
|---|---|---|
| waterfastness | 94% | 12% |
| print quality | good coverage | extreme mottling |

Aluminum Foil

|  | precoat and ink | only ink |
|---|---|---|
| waterfastness | 96% | 0% |
| print quality | good coverage | mottled |

Aluminum Plate

|  | precoat and ink | only ink |
|---|---|---|
| waterfastness | 99% | 0% |
| print quality | good coverage | mottled |

From these results, it is seen that a sufficient amount of DMEA has the advantage of preventing adverse interaction that occurs between the two polymers when DMEA is not present. This, in turn, enhances waterfastness of the image, producing prints that are resistant to dry or wet rub. A 45% solvent mixture of alcohol and MEK is selected as a preferred formulation to speed up drying, therefore not requiring a dryer to dry the coated surface before imaging, and to enhance wetting. When alcohol was eliminated and 45% MEK was used, the fluid was not stable and actually separated into distinct layers. When DMEA and MEK were eliminated from the formulation of Example 1, the fluid was again not stable and it separated into distinct layers. In a preferred embodiment, addition of as high as 5% DMEA is necessary to keep the cationic charge on the EPI at a minimum, thereby discouraging interaction with the acrylic polymer, until the coated surface is imaged with the aqueous ink.

Therefore, in a preferred embodiment of the present invention, the aqueous coating solution comprises 5–10% (on 100% basis) of EPI at a 37% solution or PI at a 50% solution, and a minimum of 5% % of DMEA. The acrylic polymer can comprise styrene acrylic copolymer, in an amount of about 20% to 50%, and preferably 45%, by weight of a 30% weight basis. A preferred embodiment further comprises both MEK and alcohol. Alcohol acts as a better solvent than MEK for components in the coating, while MEK is better than alcohol in etching the substrate, for better penetration of the fluid into the surface of the substrate. A ratio of MEK to alcohol is selected to provide stability of the coating fluid and optimum adhesion to the substrate, with a suitable ratio of MEK to alcohol in a preferred embodiment being about 2 to 1.

The coating solution may be applied by any suitable means, such as, for example, by spraying, roller arrangement, or application by a printhead positioned inline with the ink-applying printheads. When a printhead is used to apply the coating solution, the option exists of covering only the printed image area with the coating material, rather than the entire area of the substrate. After application of the image, the print can be dried, such as with a heat gun, to set the image.

Pre-coat application can provide the advantage of eliminating color-to-color bleed during imaging, since the dyes are fixed instantaneously as the ink contacts the pre-coated substrate. Furthermore, with pre-coating, images appear darker and have sharper edge definition, since the coating minimizes ink penetration and allows more fixed dyes on the surface. Finally, complete drying of the pre-coated substrate may not be necessary. Therefore, drying can be applied once after imaging, resulting in considerable savings in energy.

Imaging can be done on a continuous web, wherein the substrate is subjected to the coating material of the present invention. Imaging can be accomplished on a moving bindery line, for example, with the printhead positioned at a 90 degree angle to the substrate. The various color heads are positioned behind each other so that they image sequentially on the substrate as it passes underneath the head. In order to obtain high quality color images, multiple drops of each color ink are printed at each pixel location. The jet spacing is 240–300 dpi with an orifice diameter of 0.7 to 0.9 mil. The stimulation frequency is 100 kHz and all heads are synchronized.

As will be obvious to anyone skilled in the art, the components that comprise the coating are commercially available. It is also understood and known in the art that waterfastness is dye specific, resulting in variations in the amount of waterfastness achieved, particularly when varying the inks being applied to the substrate. Almost all ink jet inks applied on a variety of commodity substrates give vastly varying image quality. Differences occur in optical density, brilliance, permanence, drying and dot resolution. The substrate coating composition of the present invention is particularly adaptable for printing permanent images on non-porous and semi-porous substrates, such as metals and plastics. It will also be obvious to those skilled in the art that additional optional additives can be included in the formulation without departing from the scope of the invention. For example, additional optional additives can include fluorosurfactants such as Zonyl, to further enhance wetting, and a biocide to keep the fluid bacteria free.

The invention has been described in detail with particular reference to certain preferred embodiments thereof, but it will be understood that modifications and variations can be effected within the spirit and scope of the invention.

What is claimed is:

1. A coating fluid for enhancing permanence of ink jet imaging on non-porous and semi-porous substrates, the coating fluid consisting essentially of a polyethyleimine or an ethoxylated polyethyleimine polymers, an acrylic polymer, dimethylethanolamine in an amount sufficient to prevent interaction between the polymers, and a mixture of methyl ethyl ketone and alcohol.

2. A coating fluid as claimed in claim 1 wherein the coating fluid comprises an ethoxylated polyethyleneimine polymer.

3. A coating fluid as claimed in claim 2 wherein the ethoxylated polyethyleneimine comprises from about 1.11 % to 3.7% by weight.

4. A coating fluid as claimed in claim 3 wherein the ethoxylated polyethyleneimine comprises 1.85% by weight.

5. A coating fluid as claimed in claim 1 wherein the coating fluid comprises a polyethyleneimine polymer.

6. A coating fluid as claimed in claim 5 wherein the polyethyleneimine comprises from about 1.5% to 5.0% by weight.

7. A coating fluid as claimed in claim 6 wherein the polyethyleneimine comprises 2.0% by weight.

8. A coating fluid as claimed in claim 1 wherein the acrylic polymer comprises styrene acrylic copolymer.

9. A coating fluid as claimed in claim 8 wherein the styrene acrylic copolymer is present in an amount of about 6.0% to 15.0% by weight.

10. A coating fluid as claimed in claim 9 wherein the styrene acrylic copolymer comprises 13.5% by weight.

11. A coating fluid as claimed in claim 1 wherein the dimethylethanolamine is present in an amount of about 3% to 8% by weight.

12. A coating fluid as claimed in claim 11 wherein the dimethylethanolamine comprises 5% by weight.

13. A coating fluid as claimed in claim 1 wherein the alcohol is present in an amount of about 10% to 20% by weight.

14. A coating fluid as claimed in claim 13 wherein the alcohol is present in an amount of about 15% by weight.

15. A coating fluid as claimed in claim 1 wherein the methyl ethyl ketone is present in an amount of about 20% to 50% by weight.

16. A coating fluid as claimed in claim 15 wherein the methyl ethyl ketone is present in an amount of about 30% by weight.

17. A method of forming an ink jet image comprising providing a non-porous or semi-porous substrate, precoating on the substrate a coating fluid comprising a polyethyleimine or an ethoxylated polyethyleimine polymers, an acrylic polymer, dimethylethanolamine in an amount sufficient to prevent interaction between the polymers, and a mixture of methyl ethyl ketone and alcohol; and subsequently ink jet printing an image onto the substrate.

18. An imaged element comprising a non-porous or semi-porous substrate, a coating on the substrate, said coating comprising a polyethyleimine or an ethoxylated polyethyleimine polymer, an acrylic polymer, and dimethylethanolamine in an amount sufficient to prevent interaction between the polymers; and a printed ink jet image applied after the substrate coating.

19. A coating fluid for enhancing permanence of ink jet imaging on non-porous and semi-porous substrates, the coating fluid comprising a polyethyleimine or an ethoxylated polyethyleimine polymer, an acrylic polymer, dimethylethanolamine in an amount sufficient to prevent interaction between the polymers, and a mixture of methyl ethyl ketone and alcohol, wherein the dimethylethanolamine is present in an amount of about 3% to 8% by weight.

20. A coating fluid for enhancing permanence of ink jet imaging on non-porous and semi-porous substrates, the coating fluid comprising a polyethyleimine or an ethoxylated polyethyleimine polymer, an acrylic polymer, dimethylethanolamine in an amount sufficient to prevent interaction between the polymers, and a mixture of methyl ethyl ketone and alcohol, wherein the methyl ethyl ketone is present in an amount of 20% to 50% by weight.

* * * * *